No. 739,135. PATENTED SEPT. 15, 1903.
J. P. ANGELL.
CAR OR OTHER VEHICLE STOPPING DEVICE.
APPLICATION FILED APR. 14, 1903.
NO MODEL. 2 SHEETS—SHEET 1.
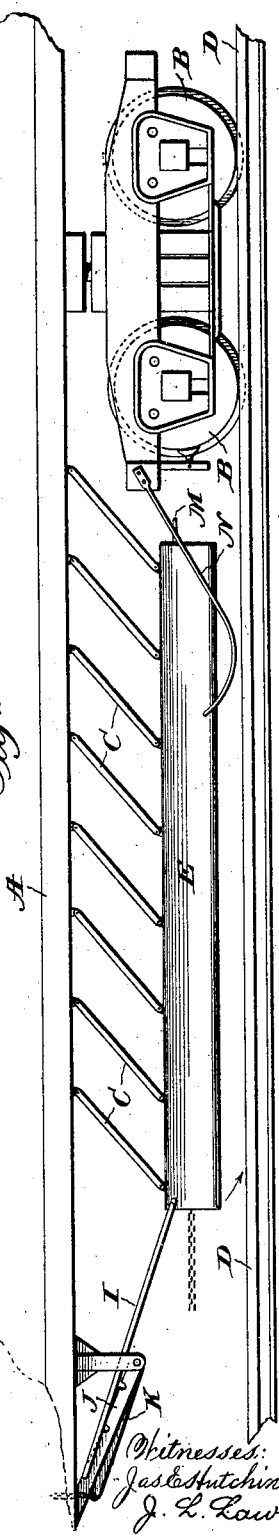
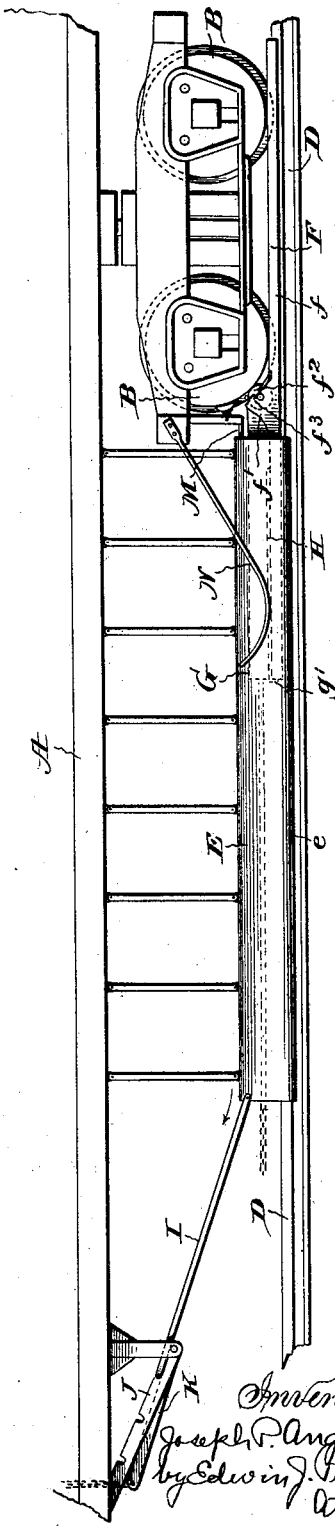
Witnesses:
Jas. E. Hutchinson.
J. L. Lawlor.
Inventor:
Joseph P. Angell,
by Edwin J. Prindle
Atty No. 739,135. PATENTED SEPT. 15, 1903.
J. P. ANGELL.
CAR OR OTHER VEHICLE STOPPING DEVICE.
APPLICATION FILED APR. 14, 1903.
NO MODEL. 2 SHEETS—SHEET 2.
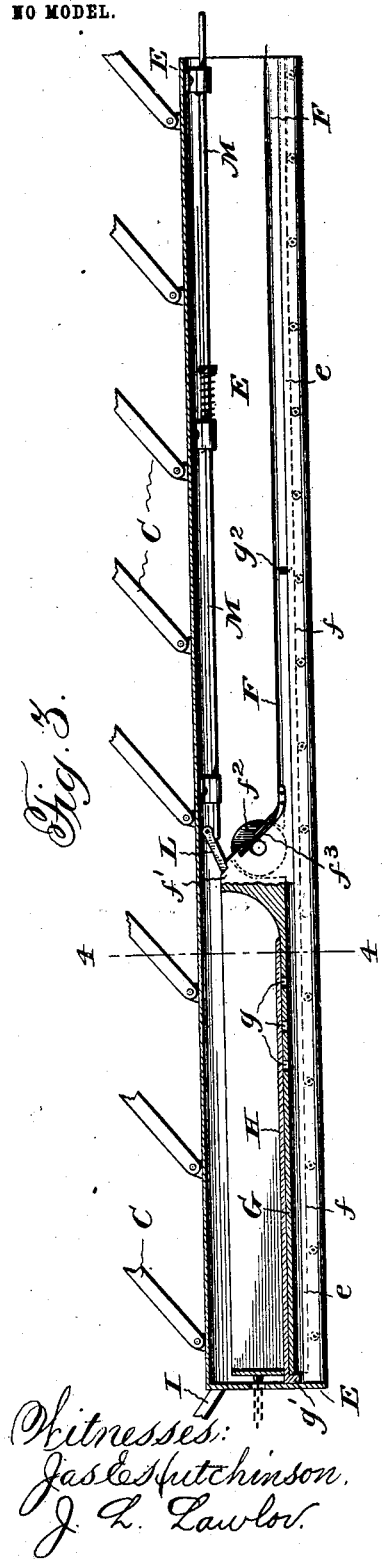
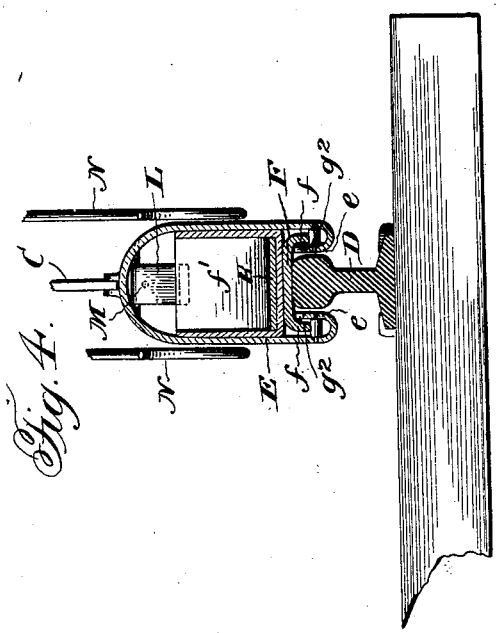
Witnesses:
Jas E. Hutchinson
J. L. Lawlor
Inventor:
Joseph P. Angell,
by Edwin J. Prindle, Atty.

No. 739,135. Patented September 15, 1903.

UNITED STATES PATENT OFFICE.

JOSEPH P. ANGELL, OF PINE BLUFF, ARKANSAS.

CAR OR OTHER VEHICLE STOPPING DEVICE.

SPECIFICATION forming part of Letters Patent No. 739,135, dated September 15, 1903.

Application filed April 14, 1903. Serial No. 152,531. (No model.)

*To all whom it may concern:*

Be it known that I, JOSEPH P. ANGELL, of Pine Bluff, in the county of Jefferson, and in the State of Arkansas, have invented a certain new and useful Improvement in Car or other Vehicle Stopping Devices; and I do hereby declare that the following is a full, clear, and exact description thereof, reference being had to the accompanying drawings, in which—

Figure 1 is a view in side elevation of enough of a car to show the adaptation of my invention thereto, the stopping device being illustrated in position out of use. Fig. 2 is a similar view showing the device in car-stopping position. Fig. 3 is a longitudinal section through the skid-carrier with the skid in place therein, and Fig. 4 is a cross-section on the line 4 4 of Fig. 3.

My invention relates to car-stopping means of the kind in which a body is interposed between the car-wheels and the track, so that the car-wheels are separated from the track, a sliding body being in contact therewith instead of the wheels; and the object of my invention is to provide a device of this description of the utmost simplicity of construction and the highest efficiency, neither of these qualities being sacrificed at the expense of the other, for, as will be evident, both are essential to a satisfactory device; and to this end my invention consists in the vehicle-stopping device constructed substantially as hereinafter specified and claimed.

My invention is applicable for use in connection with steam or street cars, automobiles, and carriages, or vehicles of any description mounted upon wheels; but it will be sufficient to illustrate my invention to describe its construction and use in connection with a car.

In the drawings are shown a portion of a car-body A and the wheels B of one of the trucks thereof. Suspended in any desirable way from the car, preferably by a series of links C and vertically in line with each track-rail D, is a long horizontal rail-like frame E, that is hollow and having in its bottom an opening of a width somewhat greater than the width of the rail D. Adapted to be contained within and supported by said frame is a skid that consists of a bar or rail F, having sufficient length to enable it to extend beneath all the wheels B of a truck on the same side of the car with the skid. The skid on opposite sides has vertical flanges $f$, which when the skid is on the rail project down on both sides of the track-rail. The skid when within the frame E or "skid-carrier," as I prefer to term said frame, is supported therein by its flanges $f$, resting upon inwardly-turned ledges $e$ at the bottom of the carrier or upon rollers thereat.

The frame or skid-carrier E is preferably made of sheet-steel, so that it has the form of an inverted trough, and when rollers are provided for the skid the inner edges of the carrier-ledges $e$ are bent upward, and the rollers are mounted between the upwardly-bent portions of the ledges and the outer sides of the carrier. Besides its part that is to pass beneath the car-wheels the skid has on its upper side a block or extension $f'$, which when the skid is on the track-rail extends sufficiently high to be engaged by the foremost wheel B, so that when it is engaged by such wheel the skid will be carried onward by the car until the car is stopped by the friction of the skids on the track. The wheel-engaging surface of the block $f'$ is preferably curved in correspondence with the curvature of the wheel-periphery, and rollers, balls, or other friction-reducing means may be employed between the wheel and block. I preferably employ, however, a roller or wheel $f^2$, journaled in bearings in the skid-block, of sufficient diameter to reach from the car-wheel to the track-rail D, a sufficient space or opening being provided in the skid to accommodate such wheel. It will be seen that by the contact of the car-wheel with the roller or wheel $f^2$ the latter will be revolved so long as the car-wheel revolves and in a direction opposite to that of the revolution of the car-wheel, so that the roller or wheel $f^2$ will revolve in contact with the track-wheel, and thereby increase the resistance to the onward movement of the car. It will thus be seen that I utilize the momentum of the revolving car-wheel to retard the onward motion of the car. The roller or wheel $f^2$ is preferably so journaled on the skid as to have some play, so that it may be assured that it will have the desired contact with the track-rail. The roller or wheel $f^2$ is held yieldingly downward by a heavy spring $f^3$, that bears upon its axle.

Preferably in advance of the block $f'$ the skid is constructed to form a hopper or receptacle G for sand, so that sand may be delivered to the track-rail between it and the skid for the purpose of increasing the frictional resistance to onward movement of the skid. One or more perforations or holes $g$ are provided in the bottom of the sand-hopper, which holes are normally closed by a slide H. The slide is automatically opened when the skid is delivered from its carrier to the track by sliding out of the carrier, the slide having for this purpose a downwardly-projecting lug $g'$, that engages a stop $g^2$, projecting from the carrier in its path, the location of such stop being such that the slide will not be moved to uncover the sand-outlet until the latter is outside the skid-carrier.

The skid-carrier, with the skid within it, is held in a raised position or a position above the track-rail by suitable mechanism which can be readily released when it is desired to drop the carrier and apply the skid—such, for example, as a bar I, pivotally attached at one end to the forward end of the carrier, and a notched bar or rack J, attached to the under side of the car, a notch in which is engaged by the forward end of the bar I—suitable means for disengaging the bar from the notch being provided, which, as shown, may consist of a lever K, adapted to be rocked by convenient hand-operated means to release the bar I.

To prevent the skid passing out of the carrier accidentally from the motion of the car, means are provided to latch it to the carrier, which means are preferably automatically released when the skid is to be put in use. Such latching means, as shown, consists of a pawl or dog L, pivoted at one end to the carrier and adapted to engage by its other end the skid projection $f'$. Mounted in a guideway in the upper part of the skid-carrier is a horizontally-slidable rod M, its front end being situated to engage the pawl and its rear end projecting beyond the rear end of the carrier in position to strike the brake-beam or some other relatively stationary part of the car when the skid-carrier is released and falls downwardly and rearward. The rod M will thus be arrested in its movement with the skid-carrier, and the movement of the latter continuing it will be seen that the front end of the rod will strike the pawl or dog L and disengage it from the skid projection, releasing the skid. If preferred, the sliding rod M may be pivoted to the pawl, and a spring or other device may be employed to return said rod to and yieldingly hold it in its normal position.

As a precaution it is desirable to provide means to prevent such lateral swaying of the skid-carrier, due to careening or rocking of the car, as might prevent such vertical alinement of the skid and track-rail as is necessary to insure the delivery of the skid to the track-rail. Such means may consist of a pair of rods N, that engage the skid-carrier on opposite sides and which may be supported upon and project from the truck, the rods being carried close to the plane of the track and their lower ends being curved upward from the road-bed to avoid their catching into the latter.

The operation of my invention is as follows: Normally the carrier F, with the skid within it and retained therein by the dog L, is supported above the track and in advance of the wheels with which the skid is to coöperate, the carrier being restrained in such position by the engagement of the bar I with the rack J. An emergency requiring the quick stoppage of the car arising, the bar I is disengaged from the rack J by the operation of the lever K, and the carrier with the contained skid immediately swings downward and rearward, and by such motion the skid-engaging dog L being released by its striking the rod M the skid will be projected from the carrier to the track in position for the advancing wheels to ride upon it and its block $f'$ or the wheel or roller $f^3$ thereon to be engaged by the foremost of the wheels. In the outward passage of the skid from the carrier the slide which closes the sand-outlet of the sand box or hopper will be moved to open such outlet, so that sand may flow to the track. To return the skid to the carrier, the car is moved backward until its wheels pass off the skid. By such backward movement of the car the carrier is passed over the skid, and if a short portion of the latter be left out of the carrier as a result of this operation the skid can be moved entirely into the carrier by hand, or, if preferred, there may be attached to it, preferably at its front end, a chain or rope O, which passes through the front end of the carrier to a suitable drum or windlass, by the operation of which the skid may be drawn into the carrier.

As the skid-carrier when the apparatus is not in use stands a short distance above the track-rail and not very far in advance of the car-wheels with which the skid is to coöperate it will be evident that the structure constitutes an effective wheel-guard, so that a person or other object that might otherwise fall on the track in front of the approaching wheels would be prevented from so doing.

It will be seen that the apparatus that I employ is extremely simple and that it performs its functions most effectively. The skid is delivered to the track with unfailing certainty as it is carried thereto by the carrier.

It will be understood that the details of construction will be varied to suit the particular vehicle with which the apparatus is to be used, and it therefore follows that such changes in these particulars as the requirements of the particular case may necessitate will involve no departure from the principle of my invention.

That feature of my invention which consists in the interposition of a wheel or roller between the car-wheel and the track is of course applicable to wheel and rail engaging devices which do not involve the employment of a part upon which the wheel rides and by which it is removed from contact with the track-rail.

Having thus described my invention, what I claim is—

1. In a device for stopping wheeled vehicles, the combination of a movable support, means suspending said support to permit it to move downward and longitudinally and a part carried by said support that is movable therefrom automatically by the downward and longitudinal movement of the support to the surface over which the wheel is traveling and in position to be engaged by said wheel.

2. In a device for stopping wheeled vehicles, the combination of a swinging support having a movement downward and rearward, and a part carried by said support that is movable therefrom to the surface over which the wheel is traveling and in position to be engaged by said wheel.

3. In a device for stopping wheeled vehicles, the combination of a movable support, swinging suspending means for the support giving it a movement downward and rearward and a skid carried by said support that is movable therefrom to the surface over which the wheel is traveling, and in position to be engaged by said wheel, a portion of the skid being adapted to extend between the wheel and such surface.

4. In a device for stopping wheeled vehicles, the combination of a movable support, means suspending said support to permit it to move downward and longitudinally, a part carried by said support that is movable therefrom to the surface over which the wheel is traveling and in position to be engaged by said wheel, and means to lock said part to the support.

5. In a device for stopping wheeled vehicles, the combination of a movable support, means suspending said support to permit it to move downward and longitudinally, a part carried by said support that is movable therefrom to the surface over which the wheel is traveling and in position to be engaged by said wheel, means to lock said part to the support, and means to automatically unlock said locking means.

6. In a device for stopping wheeled vehicles, the combination of a carrier consisting of a hollow frame having an open bottom, and a skid movably supported within such frame having portions to be engaged by and to extend beneath a vehicle-wheel.

7. In a device for stopping wheeled vehicles, the combination of a carrier that is movable to and from the wheel-engaging track, a skid that is carried thereby, and means to guide the carrier to track-engaging position.

8. In a device for stopping wheeled vehicles, the combination of a carrier that is movable to and from the wheel-engaging track, a skid that is carried thereby, and means on the carrier to engage the track.

9. In a device for stopping wheeled vehicles, the combination of a movable support, a part carried thereby that is movable therefrom to the surface over which the wheel is traveling and in position to be engaged by said wheel, and sand-delivering means associated with said part.

10. In a device for stopping wheeled vehicles, the combination of a skid, means for delivering the same to wheel-engaging position, and sand-delivering mechanism automatically operated from the skid.

11. In a device for stopping wheeled vehicles, the combination of a carrier consisting of a hollow frame having an open bottom with inturned flanges thereat, and a skid movably supported within such frame by said flanges.

12. In a device for stopping wheeled vehicles, the combination of a carrier consisting of a hollow frame having an open bottom, and a wheel-engaging skid movably supported within such frame.

13. In a device for stopping wheeled vehicles, the combination of a skid having portions to be engaged by and to extend beneath a vehicle-wheel, and a wheel or roller journaled on the skid adapted to simultaneously engage the wheel and the surface over which the wheel travels.

In testimony that I claim the foregoing I have hereunto set my hand.

JOSEPH P. ANGELL.

Witnesses:
E. A. HOWELL,
D. L. FRANKLIN.